(12) United States Patent
Tang

(10) Patent No.: US 10,301,795 B1
(45) Date of Patent: May 28, 2019

(54) POWER CABLE INSTALLATION DEVICE

(71) Applicant: Shoulin Tang, Nanyang (CN)

(72) Inventor: Shoulin Tang, Nanyang (CN)

(73) Assignee: Pujiang Qilu Environmental Protection Technology Co., Ltd., Jinhua, Zhejiang Province (CN)

( * ) Notice: Subject to any disclaimer, the term of this patent is extended or adjusted under 35 U.S.C. 154(b) by 0 days.

(21) Appl. No.: 15/976,884

(22) Filed: May 11, 2018

(51) Int. Cl.
 *E02F 5/04* (2006.01)
 *E02F 5/14* (2006.01)
(52) U.S. Cl.
 CPC . *E02F 5/04* (2013.01); *E02F 5/14* (2013.01)
(58) Field of Classification Search
 CPC ....... E02F 3/52; E02F 5/02; E02F 5/04; E02F 5/10; E02F 5/14; F16L 1/028; F16L 1/032; F16L 1/036; H02G 1/06
 USPC ..................... 37/350; 405/180–183
 See application file for complete search history.

(56) References Cited

U.S. PATENT DOCUMENTS

| | | | | |
|---|---|---|---|---|
| 3,914,948 A * | 10/1975 | Kaercher, Jr. | ............ | E02F 5/103 172/40 |
| 4,448,567 A * | 5/1984 | Tsuda | ............ | E21B 7/205 405/156 |
| 4,685,832 A * | 8/1987 | Decker | ............ | E02F 5/103 405/182 |
| 4,744,696 A * | 5/1988 | Vidler | ............ | H02G 1/06 242/418.1 |
| 5,746,541 A * | 5/1998 | Brophy | ............ | E02F 5/103 405/174 |
| 5,934,833 A * | 8/1999 | Hunter | ............ | H02G 1/06 37/367 |
| 6,332,738 B1 * | 12/2001 | Eslambolchi | ............ | F16L 1/032 324/509 |
| 2002/0066214 A1 * | 6/2002 | Miyazaki | ............ | E02F 5/101 37/367 |

FOREIGN PATENT DOCUMENTS

| CN | 105927151 | 9/2016 |
|---|---|---|
| CN | 106351577 | 1/2017 |

(Continued)

OTHER PUBLICATIONS

First Office Action for Chinese Counterpart Application 2017111297937 dated Mar. 28, 2018.

(Continued)

*Primary Examiner* — William V Gilbert

(57) ABSTRACT

This invention discloses a power cable installation device, including a cart frame and an installation frame on the cart frame. An accommodation cavity is disposed at the bottom end face of the installation frame. The accommodation cavity is slidingly connected with a sliding base. Coordinated with the first elastic recovery device and the second elastic recovery device which are interconnected with opposite sides of the accommodation cavity, the sliding base will be more stable when sliding up and down. Meanwhile, with the locking and unlocking between a locking component in the first elastic recovery device and the second guide block, the sliding base will be more stable during the transportation of the cart frame. Thus, automatic control of transmission and driving of digging and drilling work can be achieved.

6 Claims, 2 Drawing Sheets

(56) References Cited

FOREIGN PATENT DOCUMENTS

| | | |
|---|---|---|
| CN | 206157625 | 5/2017 |
| CN | 206458316 | 9/2017 |
| CN | 107288541 | 10/2017 |
| JP | 2007-291807 | 11/2007 |

OTHER PUBLICATIONS

Grant Notice for Chinese Counterpart Application 2017111297937 dated Apr. 16, 2018.

* cited by examiner

POWER CABLE INSTALLATION DEVICE

TECHNICAL FIELD

This invention relates to cable installation technology field, in particular to a new power cable installation device.

BACKGROUND TECHNOLOGY

Cables usually need to be laid under the ground in power working process. Before cable laying, a groove which can accommodate the cables should be dug on the ground. The equipment used to dig the groove has too complex structure, and the work efficiency is low.

INVENTION CONTENT

The technical problem to be solved by this invention is to provide a new power cable installation device which can solve the problems in existing technology.

This invention is implemented through the following technical proposal: a new power cable installation device includes cart frame and installation frame which is installed slidingly up and down on the cart frame. The regulating groove whose opening is rightward is set up in the said cart frame. The sliding rack is slidingly installed in the said regulating groove. The spiral column which extends up and down is installed spirally in the said sliding rack. The extension section of the bottom of the said spiral column is connected with the bottom wall of the said regulating groove. The extension section of the top of the said spiral column is connected with the main driving machine. The outer surface of the said main driving machine is installed on the upper inner wall of the said regulating groove, and is connected fixedly. The right end face of the said sliding rack is fixedly installed with the said installation frame. The accommodation cavity which extends upward is set up at the bottom end face of the said installation frame. The said accommodation cavity is slidingly connected with the sliding base. The first elastic recovery device and the second elastic recovery device which are interconnected are set up in the inner wall at the left side and right side of the said accommodation cavity. The expulsion device which is used to slidingly connect with the said first elastic recovery device is set up on the inner wall of the said installation frame which is at the top of the said first elastic recovery device. The first sliding cavity which extends at the left-right direction is set up at the inner top of the said sliding base. The said first sliding cavity is slidingly connected with the first sliding block. The locking rod which extends to the left is fixedly set up at the left of the said first sliding block. The left extension end of the said locking rod runs through the left outer end of sliding base and is slidingly connected. The right end face of the said first sliding block is connected spirally with the first spiral rod which extends to the right. The right extension end of the said first spiral rod is connected with the first driving machine. The oblique groove is set up in the bottom end face of the said first sliding block. The second sliding cavity is set up in the said sliding base under the said first sliding cavity. The through cavity is set up in the said sliding base under the said second sliding cavity. The said second sliding cavity is slidingly connected with the connecting sliding block. The rod body which extends upward is fixedly set up on the top end face of the said connecting sliding block. The top extension end of the said rod body runs through the inner wall of the said sliding base between the said first sliding cavity and the said second sliding cavity, and is slidingly connected. The oblique part which stretches into the said oblique groove is fixedly set up on the top extension end of the said rod body, and is connected by extruding and sliding. The said first elastic element is set up between the left bottom end face of the said connecting sliding block and the left inner bottom wall of the said second sliding cavity. The mounting plate which extends downward is fixedly set up at the right bottom end face of the said connecting sliding block. The bottom extension section of the said mounting plate runs through the inner wall of the said sliding base between the said second sliding cavity and the said through cavity, and is slidingly connected. The second driving machine is fixedly set up in the bottom end face of the said mounting plate. The first cone pulley which stretches into the said through cavity is connected at the bottom end of the said second driving machine. The digging component which is connected with the said first cone pulley is set up in the said through cavity at the left of the said first cone pulley. The protecting and supporting device is also set up on the external of the said first driving machine.

As an optimal technical proposal, the outer surface of the said first driving machine is installed on the right inner wall of the said first sliding cavity, and is connected fixedly.

As an optimal technical proposal, the said first elastic recovery device includes the first guide groove which is set up in the left inner wall of the said accommodation cavity in an interconnected way, and the first guide block which is slidingly connected in the said first guide groove. The second elastic element is connected in the said first guide groove which is at the bottom of the said first guide block through extruding. The locking hole which extends to the left is set up in the right end face of the said first guide block. The said second elastic recovery device includes the second guide groove which is set up in the right inner wall of the said accommodation cavity in an interconnected way, and the second guide block which is slidingly connected in the said second guide groove and whose left end is fixedly connected with the right end face of the said sliding base. The third elastic element is connected in the said second guide groove which is at the bottom of the said second guide block through extruding. The locking component is which is connected with the bottom end face of the said second guide block through extruding and locking is set up in the right inner wall of the said second guide groove.

As an optimal technical proposal, the said extrusion device includes the cavity which is set up in the top wall of the said first guide groove in an interconnected way, and extruding eccentric gear which is connected in the said cavity. The steering shaft which extends at the left-right direction is fixedly set up on the said extruding eccentric gear. The left extension end of the said steering shaft is connected with the third driving machine. The outer surface of the said third driving machine is installed on the left inner wall of the said cavity, and is fixedly connected. The right extension end of the said steering shaft is connected with the right inner wall of the said cavity in a rotary way.

As an optimal technical proposal, the said digging component includes the drilling head which extends in the through the said cavity, and the second cone pulley which is fixedly set up on the outer surface of the said drilling head at the circumferential direction. The top extension end of the said drilling head is connected with the inner top wall of through the said cavity in a rotary way. The bottom extension section of the said drilling head runs through the bottom end face of the said sliding base, and is connected in a rotary way. The bottom extension end of the said drilling head is longer than the bottom end face of the said sliding base.

As an optimal technical proposal, the said protecting and supporting device includes shakeproof cushion and radiating fin. The said shakeproof cushion is set up on the upper end and lower end of the said first driving machine, and fixedly connected with the said first driving machine. The said radiating fin is set up on the front end and rear end of the said first driving machine, and fixedly connected with the said first driving machine.

Beneficial effects of this utility model are as follows: with the simple structure, this invention is convenient to operate. The first elastic recovery device and the second elastic recovery device which are interconnected are set up in the inner wall at the left side and right side of accommodation cavity. The expulsion device which is used to slidingly connect with the first elastic recovery device is set up on the inner wall of installation frame which is at the top of the first elastic recovery device. The first sliding cavity which extends at the left-right direction is set up at the inner top of the sliding base. The first sliding cavity is slidingly connected with the first sliding block. The locking rod which extends to the left is fixedly set up at the left of the first sliding block. The left extension end of the locking rod runs through the left outer end of sliding base and is slidingly connected. The right end face of the first sliding block is connected spirally with the first spiral rod which extends to the right. The right extension end of the first spiral rod is connected with the first driving machine. The oblique groove is set up in the bottom end face of the first sliding block. The second sliding cavity is set up in the sliding base under the first sliding cavity. The through cavity is set up in the sliding base under the second sliding cavity. The second sliding cavity is slidingly connected with the connecting sliding block. The rod body which extends upward is fixedly set up on the top end face of connecting sliding block. The top extension end of the rod body runs through the inner wall of sliding base between the first sliding cavity and the second sliding cavity, and is slidingly connected. The oblique part which stretches into the oblique groove is fixedly set up on the top extension end of the rod body, and is connected by extruding and sliding. The first elastic element is set up between the left bottom end face of connecting sliding block and the left inner bottom wall of the second sliding cavity. The mounting plate which extends downward is fixedly set up at the right bottom end face of the connecting sliding block. The bottom extension section of the mounting plate runs through the inner wall of the sliding base between the second sliding cavity and the through cavity, and is slidingly connected. The second driving machine is fixedly set up in the bottom end face of mounting plate. The first cone pulley which stretches into the through cavity is connected at the bottom end of the second driving machine. The digging component which is connected with the first cone pulley is set up in the through cavity at the left of the first cone pulley, which can achieve automatic control of guide sliding of the first elastic recovery device and the second elastic recovery device with the sliding base, and improve sliding stability of sliding base. Meanwhile, the locking with the second guide block and deblocking connection by the locking component make the cart frame enhance stability of sliding base in the transportation process. Thus, automatic control of transmission and driving of digging and drilling work can be achieved. Besides, safety and work efficiency of digging and drilling can improve.

BRIEF DESCRIPTION OF THE DRAWINGS

To explain it easily, this invention is detailed by the following specific implementation examples and the attached figures.

DETAILED DESCRIPTION OF THE DRAWINGS

Figure 1:
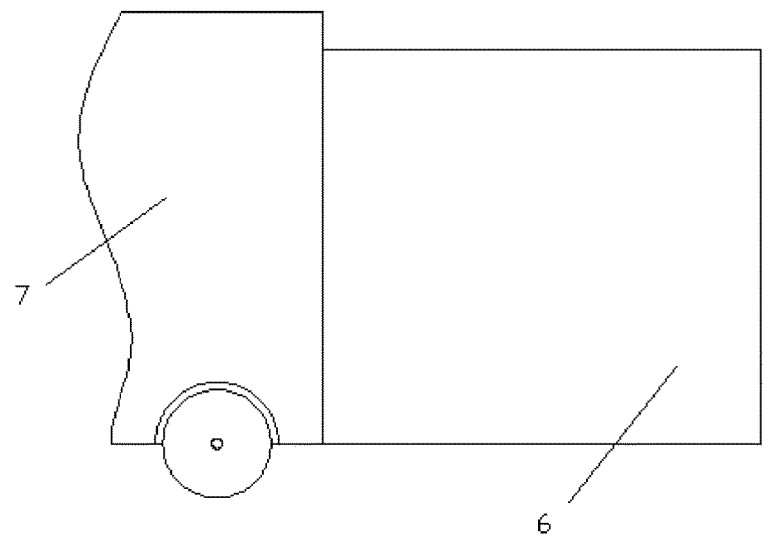
FIG. 1 shows the external structure diagram of this invention.
Figure 2:
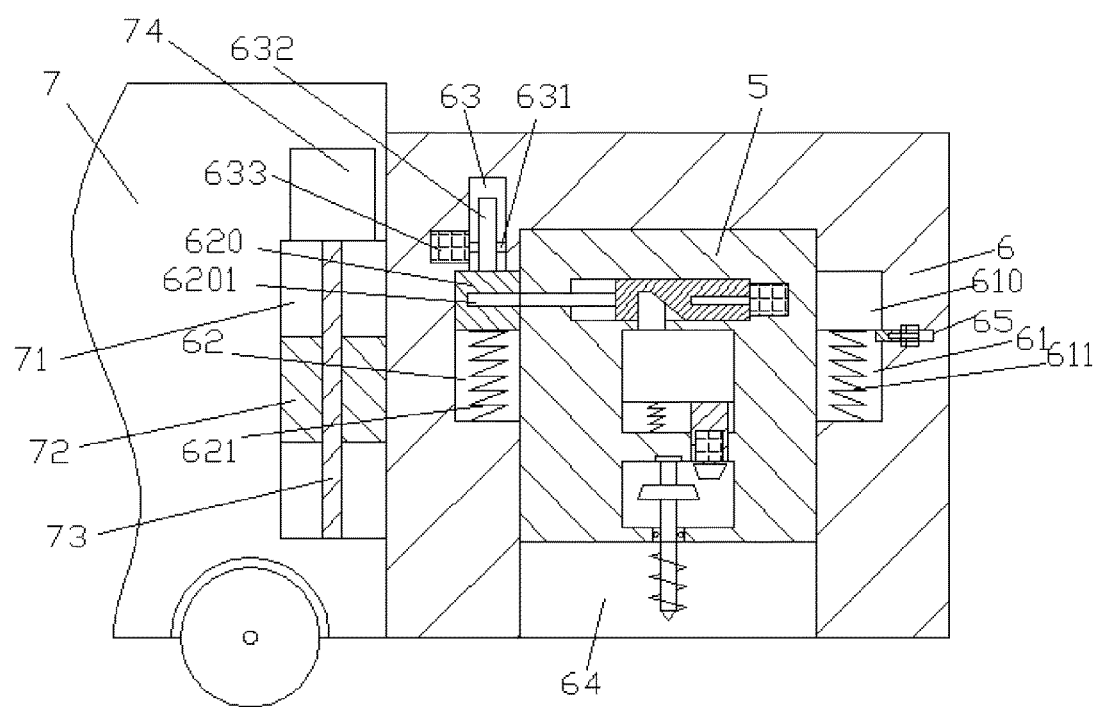
FIG. 2 shows the internal structure diagram of this invention.
Figure 3:
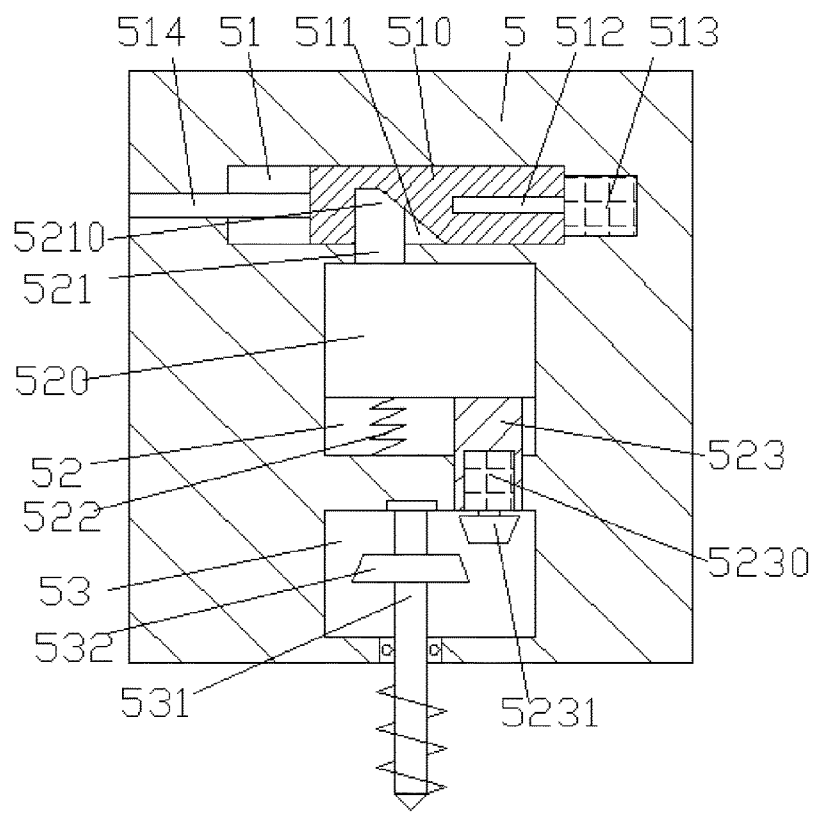
FIG. 3 shows the internal structure diagram of sliding base.
Figure 4:
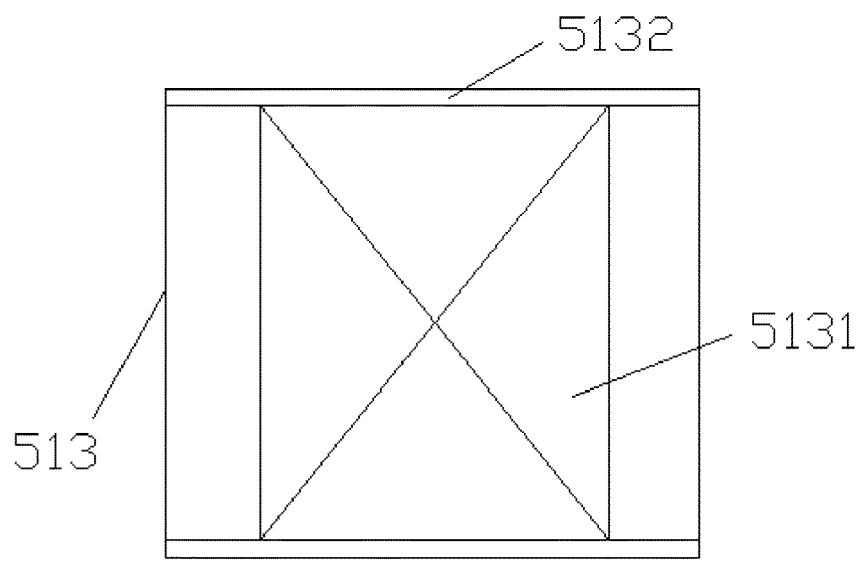
FIG. 4 shows the structure diagram of protecting and supporting device.

As shown in FIGS. 1-4, a new power cable installation device includes cart frame 7 and installation frame 6 which is installed slidingly up and down on the said cart frame 7. The regulating groove 71 whose opening is rightward is set up in the said cart frame 7. The sliding rack 72 is slidingly installed in the said regulating groove 71. The spiral column 73 which extends up and down is installed spirally in the said sliding rack 72. The extension section of the bottom of the said spiral column 73 is connected with the bottom wall of the said regulating groove 71. The extension section of the top of the said spiral column 73 is connected with the main driving machine 74. The outer surface of the said main driving machine 74 is installed on the upper inner wall of the said regulating groove 71, and is connected fixedly. The right end face of the said sliding rack 72 is fixedly installed with the said installation frame 6. The accommodation cavity 64 which extends upward is set up at the bottom end face of the said installation frame 6. The said accommodation cavity 64 is slidingly connected with the sliding base 5. The first elastic recovery device and the second elastic recovery device which are interconnected are set up in the inner wall at the left side and right side of the said accommodation cavity 64. The expulsion device which is used to slidingly connect with the first elastic recovery device is set up on the inner wall of the said installation frame 6 which is at the top of the said first elastic recovery device. The first sliding cavity 51 which extends at the left-right direction is set up at the inner top of the said sliding base 5. The said first sliding cavity 51 is slidingly connected with the first sliding block 510. The locking rod 514 which extends to the left is fixedly set up at the left of the said first sliding block 510. The left extension end of the said locking rod 514 runs through the left outer end of the said sliding base 5 and is slidingly connected. The right end face of the said first sliding block 510 is connected spirally with the first spiral rod 512 which extends to the right. The right extension end of the said first spiral rod 512 is connected with the first driving machine 513. The oblique groove 511 is set up in the bottom end face of the said first sliding block 510. The second sliding cavity 52 is set up in the said sliding base 5 under the said first sliding cavity 51. The through cavity 53 is set up in the said sliding base 5 under the said second sliding cavity 52. The said second sliding cavity 52 is slidingly connected with the connecting sliding block 520. The rod body 521 which extends upward is fixedly set up on the top end face of the said connecting sliding block 520. The top extension end of the said rod body 521 runs through the inner wall of the said sliding base 5 between the said first sliding cavity 51 and the said second sliding cavity 52, and is slidingly connected. The oblique part 5210 which stretches into the said oblique groove 511 is fixedly set up on the top extension end of the said rod body 521, and is connected by extruding and sliding. The first elastic element 522 is set up between the left bottom end face of the said connecting sliding block 520 and the left inner bottom wall of the said second sliding cavity 52. The mounting plate 523 which extends downward is fixedly set up at the right bottom end face of the said connecting sliding block 520. The bottom extension section of the said mounting plate 523 runs through the inner wall of the said sliding base 5 between the said second sliding cavity 52 and the said through cavity 53, and is slidingly connected. The second driving machine 5230 is fixedly set up in the bottom end face of the said mounting plate 523. The first cone pulley 5231 which stretches into the said through cavity 53 is connected at the bottom end of the said second driving machine 5230. The digging component which is connected with the said first cone pulley 5231 is set up in the said through cavity 53 at the left of the said first cone pulley 5231. The protecting and supporting device is also set up on the external of the said first driving machine 513.

Beneficially, the outer surface of the said first driving machine 513 is installed in the right inner wall of the said first sliding cavity 51, and is fixedly connected.

Beneficially, the said first elastic recovery device includes the first guide groove 62 which is set up in the left inner wall of the said accommodation cavity 64 in an interconnected way, and the first guide block 620 which is slidingly connected in the said first guide groove 62. The second elastic element 621 is connected in the said first guide groove 62 which is at the bottom of the said first guide block 620 through extruding. The locking hole 6201 which extends to the left is set up in the right end face of the said first guide block 620. The said second elastic recovery device includes the second guide groove 61 which is set up in the right inner wall of the said accommodation cavity 64 in an interconnected way, and the second guide block 610 which is slidingly connected in the said second guide groove 61 and whose left end is fixedly connected with the right end face of the said sliding base 5. The third elastic element 611 is connected in the said second guide groove 61 which is at the bottom of the said second guide block 610 through extruding. The locking component 65 is which is connected with the bottom end face of the said second guide block 610 through extruding and locking is set up in the right inner wall of the said second guide groove 61, which can achieve automatic control of guide sliding of the first elastic recovery device and the second elastic recovery device with the sliding base 5, and improve sliding stability of sliding base 5. Meanwhile, the locking with the said second guide block 610 and deblocking connection by the locking component 65 make the cart frame 7 enhance stability of sliding base 5 in the transportation process.

Beneficially, the said extrusion device includes the cavity 63 which is set up in the top wall of the said first guide groove 62 in an interconnected way, and extruding eccentric gear 632 which is connected in the said cavity 63. The steering shaft 631 which extends at the left-right direction is fixedly set up on the said extruding eccentric gear 632. The left extension end of the said steering shaft 631 is connected with the third driving machine 633. The outer surface of the said third driving machine 633 is installed on the left inner wall of the said cavity 63, and is fixedly connected. The right extension end of the said steering shaft 631 is connected with the right inner wall of the said cavity 63 in a rotary way so that the extruding eccentric gear 632 in the extrusion device drives the first guide block 620 in the first elastic recovery device to slide up and down.

Beneficially, the said digging component includes the drilling head 531 which extends in the said through cavity 53, and the second cone pulley 532 which is fixedly set up on the outer surface of the said drilling head 531 at the circumferential direction. The top extension end of the said drilling head 531 is connected with the inner top wall of the said through cavity 53 in a rotary way. The bottom extension section of the said drilling head 531 runs through the bottom end face of the said sliding base 5, and is connected in a rotary way. The bottom extension end of the said drilling head 531 is longer than the bottom end face of the said sliding base 5 so as to achieve automatic control of transmission and driving of digging and drilling work and to improve safety and work efficiency of digging and drilling.

The said protecting and supporting device includes shakeproof cushion 5132 and radiating fin 5131. The said shakeproof cushion 5132 is set up on the upper end and lower end of the said first driving machine 513, and fixedly connected with the said first driving machine 513. The said radiating fin 5131 is set up on the front end and rear end of the said first driving machine 513, and fixedly connected with the said first driving machine 513. The said radiating fin 5131 is used to absorb and dissipate the heat generated by the said first driving machine 513 in the operation process. The said shakeproof cushion 5132 is used to reduce shaking force generated by the said first driving machine 513 in the operation process so as to prevent shaking of the said sliding base 5 due to too strong shaking force in the operation process of the first driving machine.

In the original stage, the third driving machine 633 controls the steering shaft 631 to drive rotation of extruding eccentric gear 632 so that the protruding part on the extruding eccentric gear 632 keeps away from the first guide groove to the largest extent. At this moment, the first guide block 620 suffers extrusion force of the second elastic element 621 and slides to the top of the first guide groove 62. Meanwhile, the second guide block 610 suffers extrusion force of the third elastic element 611 and slides to the top of the second guide groove 61. At the same time, the second guide block 610 drives the sliding base 5 to slide to the top of accommodation cavity 64. At this moment, the sliding base 5 drives the drilling head 531 under the top end face to be totally in the accommodation cavity 64. Meanwhile, the first sliding block 510 is farthest to the right of the first sliding cavity 51. At this moment, the first sliding block 510 drives the locking rod 514 at the left end to be totally in the left inner wall of sliding base 5, and the left end of locking rod 514 and the locking hole 6201 are in the relative state. Meanwhile, the connecting sliding block 520 suffers extrusion force of the first elastic element 522 and slides to the top of the second sliding cavity 52. Then, the connecting sliding block 520 drives the rod body 521 at the top and the oblique part 5210 at the top end of rod body 521 to slide in the oblique groove 511 to the largest extent, and is collected through extruding and sliding. In the meantime, the connecting sliding block 520 drives the mounting plate 523 at the right bottom to stretch into the second sliding cavity 52 to the largest extent. At this moment, the mounting plate 523 drives the first cone pulley at the bottom end to keep away from the drilling head 531 to the largest extent.

When digging and drilling are needed, firstly, the first driving machine 513 drives the first spiral rod 512 to rotate. The first spiral rod 512 drives the first sliding block 510 to gradually slide to the left along the first sliding cavity 51. At this moment, the first sliding block 510 drives the locking rod 514 on the left end to gradually stretch into the locking hole 6201. Meanwhile, the oblique groove 511 in the bottom end face of the first sliding block 510 is slidingly connected with the oblique part 5210. Then, the oblique part 5210 drives the rod body 521 and the connecting sliding block 520 at the bottom end of rod body 521 to gradually overcome extrusion force of the first elastic element 522, and gradually slides to the bottom of the second sliding cavity 52. In the meantime, the connecting sliding block 520 drives the bottom end of mounting plate 523 to gradually stretch into the through cavity 53. Then, the first cone pulley 5231 on the bottom end of mounting plate 523 gradually approaches the second cone pulley 532 until the first sliding block 510 slides to the farthest left of the first sliding cavity 51. At this moment, the first sliding block 510 drives the locking rod 514 on the left end to furthest stretch into the locking hole 6201. At the same time, the bottom end face of the first sliding block 510 is slidingly connected with the top end of oblique part 5210. Then, the oblique part 5210 is completely extruded by the first sliding block 510 and slides in the first sliding cavity 51. Meanwhile, the oblique part 5210 drives the rod body 521 and the connecting sliding block 520 at the bottom end of rod body 521 to overcome extrusion force and the first elastic element 522 and furthest slide to the bottom of the second sliding cavity 52. Then, the connecting sliding block 520 drives the bottom end of mounting plate 523 to furthest stretch into the through cavity 53. Besides, the first cone pulley 5231 on the bottom end of mounting plate 523 completely meshes with the second cone pulley 532. Then, the locking component 65 is controlled to totally break away from the second guide block 610. At this moment, the second driving machine 5230 is controlled to drive the first cone pulley 5231 to rotate. Then, the first cone pulley 5231 drives the second cone pulley 532 and drilling head 531 on the second cone pulley 532 to rotate. In the meantime, the third driving machine 633 drives the steering shaft 631 and the extruding eccentric gear 632 on the steering shaft 631 to rotate. The protruding part on the extruding eccentric gear 632 continuously connects with the first guide block 620 through sliding. Then, the locking rod 514 in the locking hole 6210 drives the sliding base 5 to achieve repeated up-down sliding.

Beneficial effects of this utility model are as follows: with the simple structure, this invention is convenient to operate. The first elastic recovery device and the second elastic recovery device which are interconnected are set up in the inner wall at the left side and right side of accommodation cavity. The expulsion device which is used to slidingly connect with the first elastic recovery device is set up on the inner wall of installation frame which is at the top of the first elastic recovery device. The first sliding cavity which extends at the left-right direction is set up at the inner top of the sliding base. The first sliding cavity is slidingly connected with the first sliding block. The locking rod which extends to the left is fixedly set up at the left of the first sliding block. The left extension end of the locking rod runs through the left outer end of sliding base and is slidingly connected. The right end face of the first sliding block is connected spirally with the first spiral rod which extends to the right. The right extension end of the first spiral rod is connected with the first driving machine. The oblique groove is set up in the bottom end face of the first sliding block. The second sliding cavity is set up in the sliding base under the first sliding cavity. The through cavity is set up in the sliding base under the second sliding cavity. The second sliding cavity is slidingly connected with the connecting sliding block. The rod body which extends upward is fixedly set up on the top end face of connecting sliding block. The top extension end of the rod body runs through the inner wall of sliding base between the first sliding cavity and the second sliding cavity, and is slidingly connected. The oblique part which stretches into the oblique groove is fixedly set up on the top extension end of the rod body, and is connected by extruding and sliding. The first elastic element is set up between the left bottom end face of connecting sliding block and the left inner bottom wall of the second sliding cavity. The mounting plate which extends downward is fixedly set up at the right bottom end face of the connecting sliding block. The bottom extension section of the mounting plate runs through the inner wall of the sliding base between the second sliding cavity and the through cavity, and is slidingly connected. The second driving machine is fixedly set up in the bottom end face of mounting plate. The first cone pulley which stretches into the through cavity is connected at the bottom end of the second driving machine. The digging component which is connected with the first cone pulley is set up in the through cavity at the left of the first cone pulley, which can achieve automatic control of guide sliding of the first elastic recovery device and the second elastic recovery device with the sliding base, and improve sliding stability of sliding base. Meanwhile, the locking with the second guide block and deblocking connection by the locking component make the cart frame enhance stability of sliding base in the transportation process. Thus, automatic control of transmission and driving of digging and drilling work can be achieved. Besides, safety and work efficiency of digging and drilling can improve.

The above content is a specific implementation way of this invention. However, the protection scope of this invention is not limited to this. Any change or replacement without creative work shall be covered in the protection scope of this invention. Therefore, the protection scope of this invention shall be subject to that defined in the claim.

The invention claimed is:
1. A power cable installation device, comprising:
a cart frame;
an installation frame which is installed slidingly up and down on the cart frame, wherein a regulating groove is disposed in said cart frame;
a sliding rack slidingly installed in said regulating groove;
a spiral column which extends up and down installed spirally in said sliding rack, wherein an extension section of a bottom of said spiral column is connected with a bottom wall of said regulating groove, the extension section of a top of said spiral column is connected with a main driving machine, an outer surface of said main driving machine is installed and connected fixedly on an upper inner wall of said regulating groove, and a first end face of said sliding rack is fixedly installed with said installation frame;
an accommodation cavity which extends upward disposed at a bottom end face of said installation frame,
wherein said accommodation cavity is slidingly connected with a sliding base; a first elastic recovery device and a second elastic recovery device which are interconnected disposed at opposite sides of an interior of said accommodation cavity;
an extrusion device which is used to slidingly connect with said first elastic recovery device disposed on an inner wall of said installation frame that is at a top of said first elastic recovery device;
a first sliding cavity disposed at an inner top of said sliding base, wherein said first sliding cavity is slidingly connected with a first sliding block;

a locking rod fixedly disposed at a first end of said first sliding block, wherein an extension end of said locking rod runs through an end of said sliding base and is slidingly connected therewith;

a first spiral rod in threaded connection with a second end face of said first sliding block, wherein a first extension end of said first spiral rod is connected with a first driving machine;

an oblique groove disposed in a bottom end face of said first sliding block;

a second sliding cavity disposed in said sliding base under said first sliding cavity;

a through cavity disposed in said sliding base under said second sliding cavity, wherein a connecting sliding block is slidingly connected to an inner side of said second sliding cavity;

a rod body which extends upward fixedly disposed on a top end face of said connecting sliding block, wherein a top extension end of said rod body runs through an inner wall of said sliding base between said first sliding cavity and said second sliding cavity, and is slidingly connected therewith;

an oblique part which stretches into said oblique groove fixedly disposed on the top extension end of said rod body;

a first elastic element disposed between the bottom end face of said connecting sliding block and an inner bottom wall of said second sliding cavity;

a mounting plate which extends downward fixedly disposed at a second bottom end face of said connecting sliding block, wherein a bottom extension section of said mounting plate runs through the inner wall of said sliding base between said second sliding cavity and said through cavity, and is slidingly connected therewith;

a second driving machine fixedly disposed in a bottom end face of said mounting plate;

a first cone pulley which stretches into said through cavity connected at a bottom end of said second driving machine;

a digging component which is connected with said first cone pulley disposed in said through cavity at a first side of said first cone pulley;

a protecting and supporting device disposed on an external surface of said first driving machine, whereby said first driving machine drives said locking rod to gradually stretch into a locking hole, and meanwhile, said oblique groove in the bottom end face of said first sliding block is slidingly connected with said oblique part, so that said oblique part will drive said rod body and said connecting sliding block at a bottom end of said rod body to gradually overcome extrusion force of said first elastic element, and gradually slides to a bottom of said second sliding cavity.

2. The power cable installation device of claim 1, wherein an outer surface of said first driving machine is installed in an inner wall of said first sliding cavity, and is fixedly connected thereto.

3. The power cable installation device of claim 1, wherein said first elastic recovery device comprises:

a first guide groove which is interconnected with said interior of said accommodation cavity;

a first guide block which is slidingly connected in said first guide groove;

a second elastic element in pushing connection with said first guide groove which is at a bottom of said first guide block;

a locking hole disposed in a first end face of said first guide block;

wherein said second elastic recovery device comprises:

a second guide groove which is interconnected with the interior of said accommodation cavity;

a second guide block which is slidingly connected in said second guide groove and a first end fixedly connected with a second end of said sliding base;

a third elastic element in pushing connection with said second guide groove which is at a bottom of said second guide block;

a locking component which is in pushing connection with a bottom end face of said second guide block disposed in a first inner wall of said second guide groove.

4. The power cable installation device of claim 1, wherein said extrusion device comprises:

an extrusion device cavity which is interconnected with a top wall of said first guide groove;

an extruding eccentric gear which is in clearance fit connection in said cavity;

a steering shaft fixedly disposed on said extruding eccentric gear, wherein a first extension end of said steering shaft is connected with a third driving machine, an outer surface of said third driving machine is installed and fixedly connected on a first inner wall of said extrusion device cavity, and a second extension end of said steering shaft is rotatably connected with a second inner wall of said extrusion device cavity, whereby said extruding eccentric gear in said extrusion device drives said first guide block in said first elastic recovery device to slide up and down.

5. The power cable installation device of claim 1, wherein said digging component comprises:

a drilling head which extends in said through cavity;

a second cone pulley which is fixedly disposed on an outer surface of said drilling head in a circumferential direction, wherein a top extension end of said drilling head is rotatably connected with an inner top wall of said through cavity, a bottom extension section of said drilling head runs through a bottom end face of said sliding base and is rotatably connected thereto, and a bottom extension end of said drilling head is longer than the bottom end face of said sliding base.

6. The power cable installation device of claim 1, wherein said protecting and supporting device comprises a cushion and a radiating fin, wherein said cushion is disposed on an upper end and a lower end of said first driving machine, fixedly connected with said first driving machine, whereby said cushion is configured to reduce shaking of said sliding base due to shaking force generated in an operation process of said first driving machine, and said radiating fin is disposed on a front end and a rear end of said first driving machine, fixedly connected with said first driving machine, whereby said radiating fin is configured to absorb and dissipate heat generated by said first driving machine in the operation process.

* * * * *